US007292963B2

(12) United States Patent
Bornhoevd et al.

(10) Patent No.: US 7,292,963 B2
(45) Date of Patent: Nov. 6, 2007

(54) AGGREGATING SENSOR DATA (75) Inventors: Christof Bornhoevd, San Francisco, CA (US); Stephan Haller, Karlsruhe (CH)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 10/976,499

(22) Filed: Oct. 29, 2004

(65) Prior Publication Data

US 2006/0106581 A1 May 18, 2006

(51) Int. Cl.
*G06F 11/00* (2006.01)
*G01D 1/00* (2006.01)

(52) U.S. Cl. ..................... 702/188; 702/127
(58) Field of Classification Search .............. 702/1, 702/116, 188, 189
See application file for complete search history.

(56) References Cited

U.S. PATENT DOCUMENTS

| 6,833,932 | B1 * | 12/2004 | Thomas ............... 358/3.06 |
| 6,844,886 | B1 * | 1/2005 | Yanagawa et al. ...... 715/744 |
| 6,865,692 | B2 * | 3/2005 | Friedman et al. ......... 714/25 |
| 2004/0024768 | A1 * | 2/2004 | Haller ..................... 707/100 |
| 2004/0075549 | A1 * | 4/2004 | Haller ..................... 340/522 |
| 2005/0264401 | A1 * | 12/2005 | Haller et al. ............ 340/10.1 |
| 2006/0145831 | A1 * | 7/2006 | Bornhoevd et al. ....... 340/521 |

OTHER PUBLICATIONS

Auto-ID Center, "Auto-ID Savant Specification 1.0," Version of Sep. 1, 2003, 57 pages.

Hill et al., "System Architecture Directions for Networked Sensors"; Apr. 27, 2000, pp. 1-18.
Clark, Sean et al., "Auto-ID Savant Specification 1.0", *Auto-ID Center*, Sep. 1, 2003, pp. 1-58.
Ammerlahn, Johann "Crossbow: Smarter Sensors in Silicon" Graphics Courtesy Crossbow Technologies, Inc. and Berkeley Labs; Dec. 13, 2005 (pp. 1-22).
"Introduction to Accelerometer Applications" [online]. Crossbow Technology Inc. 2005 [retrieved on Dec. 13, 2005]. Retrieved from the Internet: <URL: http://www.xbow.com/Support/accel_appnote.htm>.
"Compassing Using Magnetic Sensors" [online]. Crossbow Technology Inc. 2005, [retrieved on Dec. 13, 2005]. Retrieved from the Internet: <URL: http://www.xbow.com/Support/mag_appnote.htm>.
"Theory of Operation of Angular Rate Sensors" [online]. Crossbow Technology Inc. 2005, [retrieved on Dec. 13, 2005]. Retrieved from the Internet: <URL: http://www.xbow.com/Support/appnotes.htm>.
"Bias Stability Measurement: Allan Variance" [online]. Crossbow Technology Inc. 2005, [retrieved on Dec. 13, 2005]. Retrieved from the Internet: <URL: http://www.xbow.com/Support/appnotes.htm>.
"Angle Random Walk" [online]. Crossbow Technology Inc. 2005, [retrieved on Dec. 13, 2005]. Retrieved from the Internet: <URL: http://www.xbow.com/Support/appnotes.htm>.

(Continued)

*Primary Examiner*—Michael Nghiem
(74) *Attorney, Agent, or Firm*—Fish & Richardson P.C.

(57) ABSTRACT

Methods, systems, and computer program products, implementing techniques for aggregating sensor data. In one aspect, the techniques include receiving sensor data values emitted by a sensor device, identifying the occurrence of a business event based on the sensor data values, and notifying an enterprise application of the occurrence of the business event. The business event being at a higher-level than the sensor data values.

10 Claims, 6 Drawing Sheets

OTHER PUBLICATIONS

"Measurement of a Vehicle's Dynamic Motion" [online]. Crossbow Technology Inc. 2005, [retrieved on Dec. 13, 2005]. Retrieved from the Internet: <URL: http://www.xbow.com/Support/appnotes.htm>.

"AHRS400 Series Installation and Troubleshooting Guide" [online]. Crossbow Technology Inc. 2005, [retrieved on Dec. 13, 2005]. Retrieved from the Internet: <URL: http://www.xbow.com/Support/appnotes.htm>.

"Datum Transformations of NAV 420 Reference Frames" [online]. Crossbow Technology Inc. 2005, [retrieved on Dec. 13, 2005]. Retrieved from the Internet: <URL: http://www.xbow.com/Support/appnotes.htm>.

"Using the NAV420CA-100 in High Vibration Environments" [online]. Crossbow Technology Inc. 2005, [retrieved on Dec. 13, 2005]. Retrieved from the Internet: <URL: http://www.xbow.com/Support/appnotes.htm>.

"How Motes Work" [online]. How Stuff Works, Inc. 2005, [retrieved on Dec. 14, 2005]. Retrieved from the Internet: <URL: http://computer.howstuffworks.com/mote.htm/printable>.

"Smart-Dust Product Information" [online]. Crossbow Technology Inc. 2005, [retrieved on Dec. 13, 2005]. Retrieved from the Internet: <URL: http://www.xbow.com/Support/appnotes.htm>.

"Wireless Systems for Environmental Monitoring" [online]. Crossbow Technology Inc. 2005, [retrieved on Dec. 13, 2005]. Retrieved from the Internet: <URL: http://www.xbow.com/Support/appnotes.htm>.

MICA2 AA Battery Pack Service Life Test [online]. Crossbow Technology Inc. 2005, [retrieved on Dec. 13, 2005]. Retrieved from the Internet: <URL: http://www.xbow.com/Support/appnotes.htm>.

"UISP, Mote Programming, and Mote Fuse Help Guide" [online]. Crossbow Technology Inc. 2003, [retrieved on Dec. 13, 2005]. Retrieved from the Internet: <URL: http://www.xbow.com/Support/appnotes.htm>.

"Fusion Filter Algorithm Enhancements For a MEMS GPS/IMU" [online]. Crossbow Technology Inc. 2005, [retrieved on Dec. 13, 2005]. Retrieved from the Internet: <URL: http://www.xbow.com/Support/appnotes.htm>.

"FAA Certification of a MEMS Attitude and Heading Reference System" [online]. Crossbow Technology Inc. 2005, [retrieved on Dec. 13, 2005]. Retrieved from the Internet: <URL: http://www.xbow.com/Support/appnotes.htm>.

"Building Sensor Networks with TinyOS" [online]. MobiSys 2003 TinyOS Tutorial, [retrieved on Dec. 13, 2005]. Retrieved from the Internet: <URL: http://www.tinyos.net/mobisys2003.html>.

"Programming TinyOS" [online]. MobiSys 2003 TinyOS Tutorial, [retrieved on Dec. 13, 2005]. Retrieved from the Internet: <URL: http://www.tinyos.net/mobisys2003.html>.

"TinyOS Systems Overview" [online]. MobiSys 2003 TinyOS Tutorial, [retrieved on Dec. 13, 2005]. Retrieved from the Internet: <URL: http://www.tinyos.net/mobisys2003.html>.

"TinyOS Hardware" [online]. MobiSys 2003 TinyOS Tutorial, [retrieved on Dec. 13, 2005]. Retrieved from the Internet: <URL: http://www.tinyos.net/mobisys2003.html>.

"TinyOS Tutorial, Part I" [online]. MobiSys 2003 TinyOS Tutorial, [retrieved on Dec. 13, 2005]. Retrieved from the Internet: <URL: http://www.tinyos.net/mobisys2003.html>.

"TinyOS Tutorial, Part II" [online]. MobiSys 2003 TinyOS Tutorial, [retrieved on Dec. 13, 2005]. Retrieved from the Internet: <URL: http://www.tinyos.net/mobisys2003.html>.

Philip Buonadonna, et al., Active Message Communication for Tiny Networked Sensors; Submitted to IEEE Infocom 2001, Apr. 2001, pp. 1-11.

John Kerwin, Overview of: System Architecture Directions for Networked Sensors, *available at* http://www-csag.ucsd.edu/teaching/cse291s03/Lectures.html (last modified Apr. 22, 2003). (24 pages).

TinyOS Tutorial, *available at* http://web.archive.org/web/20041025035444/http://www.tinyos.net/tinyos-1.x/doc/tutorial/ (last modified Sep. 23, 2003).

TinyOS Latest News, *available at* http://web.archive.org/web/20041025075554/http://www.tinyos.net/ (last modified Oct. 25, 2004).

* cited by examiner

AGGREGATING SENSOR DATA

BACKGROUND

The present invention relates to data processing by digital computer, and more particularly to automatic data acquisition and aggregation.

Systems exist for integrating data acquisition devices such as RFID tag readers with enterprise software applications that make use of the collected data. The functionality of such integration systems, however, is typically limited to passing the collected data between the data acquisition devices and the enterprise software applications. In some cases, the integration systems can batch up the collected data or filter the collected data before passing it along. However, the integration systems typically do not perform any further processing on the data.

In addition, the integration systems are typically designed to handle data acquisition devices that do not emit data continuously. For example, RFID tag readers typically only emit data when the readers detect the presence of a tagged item. The integration systems are not designed to handle data acquisition devices that emit data continuously. For example, temperature sensors generally emit a continuous stream of temperature values, perhaps one every few milliseconds. The enterprise applications, however, may not be interested in the individual temperature values and may only be interested in higher-level events like the sudden rise of temperature in a refrigeration unit. The existing integration systems, however, are not designed to process a continuous stream of sensor data values or to identify high-level events based on the sensor data.

SUMMARY OF THE INVENTION

Methods, systems, and computer program products, implementing techniques for aggregating sensor data.

In one aspect, the techniques include receiving sensor data values emitted by a sensor device, identifying the occurrence of a business event based on the sensor data values, and notifying an enterprise application of the occurrence of the business event, the business event being semantically at a higher-level than the sensor data values.

The techniques can be implemented to include one or more of the following features:

Receiving sensor data values includes receiving a continuous data stream of individual sensor data values emitted at regular intervals.

Identifying a business event based on the sensor data values includes mapping multiple individual sensor data values to a single business event.

The business event is a threshold value event, the threshold value event being an event that occurs when the sensor data values reach a threshold value.

The business event is a constant value event, the constant value event being an event that occurs when the sensor data values remain the same for a specified period of time.

The business event is a changed value event, the changed value event being an event that occurs when the sensor data values change within a specified period of time.

The business event is a rising edge event, the rising edge event being an event that occurs when the sensor data values rise more than a specified level of steepness.

The business event is a falling edge event, the falling edge event being an event that occurs when the sensor data values fall more than a specified level of steepness.

The enterprise application is a product life management application; and the sensor device is an environmental sensor that measures an environmental condition affecting one or more products managed by the product life management application.

The environmental condition is one of temperature, humidity, acceleration, pressure, light, position, movement, or sound.

In another aspect, the techniques feature one or more enterprise applications, one or more data acquisition devices, and a data integration system that connects the enterprise applications to the data acquisition devices. The data acquisition devices including both periodic devices that emit periodic data and aperiodic devices that emit aperiodic data, periodic data being data that is emitted continuously at regular intervals, aperiodic data being data that is emitted at irregular intervals. The data integration system includes processors for processing the periodic data and processors for processing the aperiodic data.

The techniques can be implemented to include one or more of the following features:

The processors for processing periodic data include a sensor data aggregator, the sensor data aggregator being software that is operable to perform operations including: receiving sensor data values emitted by one or more of the periodic devices; identifying the occurrence of a business event based on the sensor data values; and notifying an enterprise application of the occurrence of the business event, the business event being semantically at a higher-level than the sensor data values.

Identifying a business event based on the sensor data values includes mapping multiple individual sensor data values to a single business event.

The business event is a threshold value event, the threshold value event being an event that occurs when the sensor data values reach a threshold value.

The business event is a constant value event, the constant value event being an event that occurs when the sensor data values remain the same for a given period of time.

The business event is a changed value event, the changed value event being an event that occurs when the sensor data values change within a given period of time.

The business event is a rising edge event, the rising edge event being an event that occurs when the sensor data values rise more than a given level of steepness.

The business event is a falling edge event, the falling edge event being an event that occurs when the sensor data values fall more than a given level of steepness.

The enterprise applications include a product life management application; and the data acquisition devices include an environmental sensor that measures an environmental condition affecting one or more products managed by the product life management application.

The environmental condition is one of temperature, humidity, acceleration, pressure, light, position, movement, or sound.

The techniques can be implemented to realize one or more of the following advantages.

The amount of incoming data that is received by the enterprise applications is reduced. This reduces the required bandwidth needed to transfer data acquired by the sensors to the enterprise applications. This, in turn, results in better system efficiency. Furthermore, the semantic level of the incoming data is elevated. The enterprise applications no longer need to be burdened with receiving vast amounts of low-level sensor data that still needs to be interpreted and processed in order to ascertain its significance. Instead, the enterprise applications can rely on the sensor data aggregators to process the sensor data and only notify the enterprise applications when a significant high-level event occurs.

The techniques allow for sensor data processing to be integrated with RFID data processing. Thus, a single data integration system can process both sensor data and RFID data.

One implementation provides all of the above advantages.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
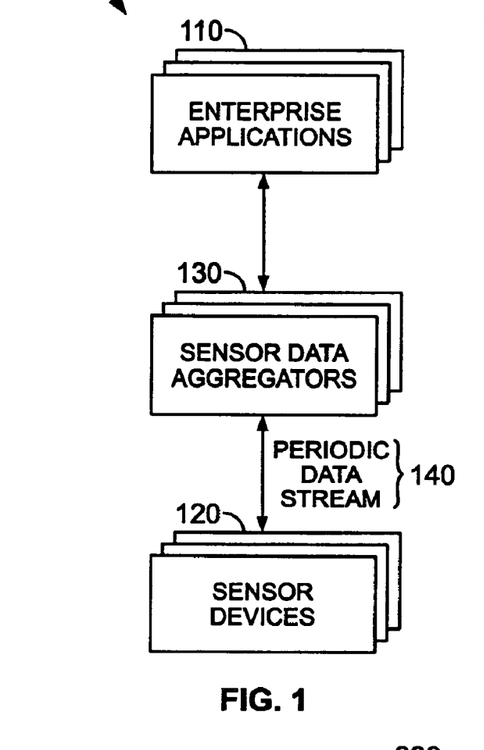
FIG. 1 is a block diagram of a system that includes sensor data aggregators.

As shown in FIG. 1, a system 100 includes one or more enterprise applications 110, one or more sensor devices 120, and one or more sensor data aggregators 130.

The enterprise applications 110 are software applications used by businesses to manage various aspects of their business operations and processes. These aspects include customer relationship management, supply chain management, and product life management, for example.

The sensor devices 120 are hardware devices that contain sensors for measuring one or more physical properties (for example, temperature, humidity, acceleration, pressure, light, position, movement or noise). The sensor devices emit a periodic stream 140 of sensor data values. A periodic stream is a continuous stream of data occurring at regular time intervals (e.g., one data value every n milliseconds), as opposed to an aperiodic stream, such as that coming from an RFID tag reader, where data is emitted at irregular intervals, for example, only when a tagged item is detected.

Figure 2:
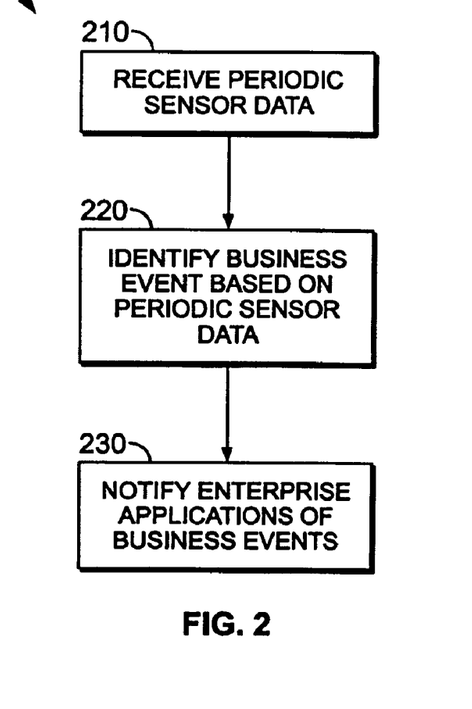
FIG. 2 is a flowchart illustrating a method for aggregating sensor data.

The sensor data aggregators 130 are software programs that are located in between the enterprise applications 110 and the sensor devices 120. During system operation, as shown in FIG. 2, the aggregators 130 receive sensor data values emitted by the sensor devices 120 (step 210), identify the occurrence of a business event based on the sensor data values (step 220) and notify the enterprise applications 110 of the occurrence of the business event (step 230).

A business event is an event of interest to the enterprise applications 110. For product life management or health and safety management applications, the events of interest can include the sudden rise in temperature of a refrigeration unit, or the lack of movement from a firefighter in the field.

Figure 3:
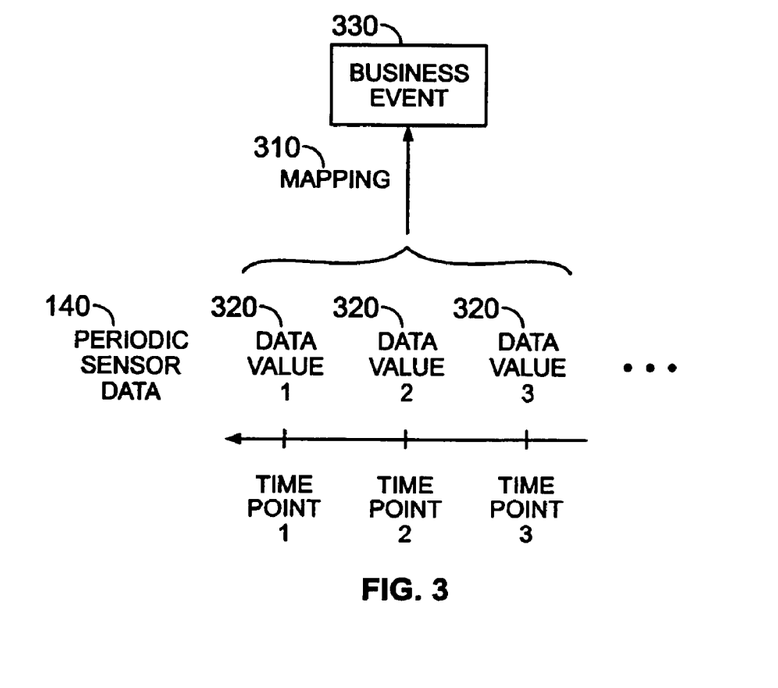
FIG. 3 illustrates mapping sensor data to business events.

As shown in FIG. 3, business events are identified by mapping 310 multiple sensor data values 320 to a single business event 330. Each data value 320 can be a single data point or alternatively, can be a vector. For example, in the case of noise sensing, the data stream can be an audio stream and each data value can be a vector that stores the amplitude, pitch, and other audio properties of the noise. This mapping can be performed according to certain algorithms, which will be described below.

Figure 4:
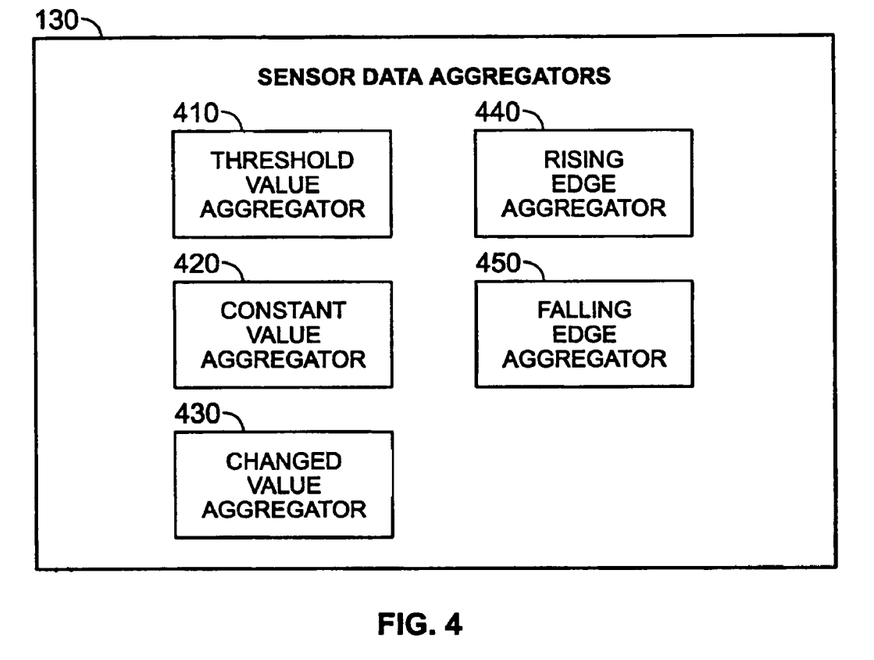
FIG. 4 illustrates different types of sensor data aggregators.

As shown in FIG. 4, the aggregators 130 can include different types of aggregators, each configured to identify different types of business events. The different types of aggregators can include a threshold value aggregator 410, a constant value aggregator 420, a changed value aggregator 430, a rising edge aggregator 440, and a falling edge aggregator 450. Other aggregator types are possible.

Threshold Value Aggregators

A threshold value aggregator 410 detects threshold value events. A threshold value event occurs when the sensor data values 320 reach a predefined threshold value. The threshold value is supplied as input to the aggregator 410. An additional input parameter to the aggregator specifies whether the threshold is an upper bound, a lower bound, or any type of bound.

In one implementation, the threshold value aggregator 410 behaves according to the following algorithm, expressed in pseudo-code. In this pseudo-code, "$x_i$" represents the sensor data value at time i.

```
loop forever {
    at time now get sensor data X_{now-1}, X_{now}
    if (Direction == 'rising') AND
        (X_{now-1} < Threshold) AND
        (X_{now} ≥ Threshold)
    then issue 'Maximum Value Alert' message
    if (Direction == 'falling') AND
        (X_{now-1} > Threshold) AND
        (X_{now} ≤ Threshold)
    then issue 'Minimum Value Alert' message
    if (Direction == 'any') AND
        ((X_{now-1} < Threshold) AND (X_{now} ≥ Threshold)
        OR
        (X_{now-1} > Threshold) AND (X_{now} ≤ Threshold))
    then issue 'Value Reached Alert' message
}
```

This algorithm can also be expressed mathematically as follows. In these mathematical expressions, "$x_i$" represents the sensor data value at time i and "c" represents the threshold value.

For upper bounds:

$$(X_{now} \geq C)^\wedge (X_{now-1} < C)$$

For lower bounds:

$$(X_{now} \leq C)^\wedge (X_{now-1} > C)$$

For either:

$$((X_{now} \geq C)^\wedge (X_{now-1} < C)) \vee ((X_{now} \leq C)^\wedge (X_{now-1} > C))$$

Constant Value Aggregators

A constant value aggregator 420 detects constant value events. A constant value event occurs when sensor data values remain constant for a specified time interval. This time interval is specified as an input to the constant value aggregator.

The constant value aggregator 420 can be configured to tolerate a certain degree of variance. If the data values change, but by no more than the tolerated degree of variance, then the data values will be considered to be constant. The variance can be specified as an additional input parameter to the constant value aggregator.

In one implementation, the constant value aggregator 420 behaves according to the following algorithm, expressed in pseudo-code. In this pseudo-code, "$x_i$" represents the sensor data value at time i.

```
Window_Size := [Sensor_Sample_Rate * Idle_Time]
loop forever {
    Constant_Value := TRUE
    at time now get sensor data X_now-Window_Size+1, ..., X_now-1, X_now
    Tolerance := (X_now/100) * Variance
    for (i:=0; i < Window_Size; i++) {
        if (X_now-i < X_now-Tolerance) AND (X_now-i > X_now+Tolerance)
            then set Constant_Value := FALSE
    }
    if (Constant_Value == TRUE)
        then issue 'Value Constant for Idle Time Alert' message
}
```

This algorithm can also be expressed mathematically as follows. In this mathematical expression, "$x_i$" represents the sensor data value at time i and "v" represents the variance. Window size "w" is calculated by multiplying the idle time parameter with the sensor sampling rate.

$$\overset{now-1}{\underset{i=now-w+1}{\forall}} x_i : \left(x_i < x_{now}\left(1 + \frac{1}{100}v\right)\right) \wedge \left(x_i > x_{now}\left(1 - \frac{1}{100}v\right)\right)$$

Changed Value Aggregators

A changed value aggregator 430 detects changed value events. A changed value event occurs when the sensor data values change within a specified time interval. This time interval is specified as input to the changed value aggregator.

In one implementation, the change must be significant, that is, the change must be more than a certain minimum level of change. The required minimum level of change can be specified as an additional input to the changed value aggregator.

In one implementation, the changed value aggregator 430 behaves according to any one of the following three algorithms, expressed in pseudo-code. In this pseudo-code, "$x_i$" represents the sensor data value at time i.

```
Algorithm 1:
Window_Size := [Sensor_Sample_Rate * Wait_Time]
loop forever {
    All_Above := TRUE
    All_Below := TRUE
    at time now get sensor data X_now-Window_Size+1, ..., X_now-1, X_now
    Tolerance := (X_now/100) * Variance
    for (i:=0; i < Window_Size; i++) {
        if (X_now-i ≤ X_now-Window_Size+1+Tolerance)
            then set All_Above := FALSE
        if (X_now-i ≥ X_now-Window_Size+1-Tolerance)
            then set All_Below := FALSE
    }
    if (All_Above == TRUE) OR (All_Below == TRUE)
        then issue 'Value Changed' message
}
```

```
Algorithm 2:
Window_Size := [Sensor_Sample_Rate * Wait_Time]
loop forever {
    Changed_Value := TRUE
    at time now get sensor data X_now-Window_Size+1, ..., X_now-1, X_now
    Tolerance := (X_now/100) * Variance
    for (i:=0; i < Window_Size; i++) {
        if (X_now-i > X_now-Window_Size+1+Tolerance) OR
           (X_now-i < X_now-Window_Size+1-Tolerance)
            then set Changed_Value := FALSE
    }
    if (Changed_Value == TRUE)
        then issue 'Value Changed' message
}
```

```
Algorithm 3:
Window_Size := [Sensor_Sample_Rate * Wait_Time]
loop forever {
    X_Average := 0
    at time now get sensor data X_now-Window_Size+1, ..., X_now-1, X_now
    for (i:=0; i < Window_Size; i++)
        X_Average := X_Average + X_now-i {
    if (X_Average > X_now-Window_Size+1+Tolerance) OR
       (X_Average < X_now-Window_Size+1-Tolerance)
        then issue 'Value Changed' message
}
```

These algorithms can also be expressed mathematically as follows. In these mathematical expressions, "$x_i$" represents the sensor data value at time i and "v" represents the variance, or the minimal level of change required to be significant.

Algorithm 1:

$$\left(\overset{now}{\underset{i=now-w+2}{\forall}} x_i : x_i > x_{now-w+1}\left(1 + \frac{1}{100}v\right)\right) \vee$$
$$\left(\overset{now}{\underset{i=now-w+2}{\forall}} x_i : x_i < x_{now-w+1}\left(1 - \frac{1}{100}v\right)\right)$$

Algorithm 2:

$$\overset{now}{\underset{i=now-w+2}{\forall}} x_i : x_i > x_{now-w+1}\left(1 + \frac{1}{100}v\right) \vee x_i < x_{now-w+1}\left(1 - \frac{1}{100}v\right)$$

Algorithm 3:

$$\bar{x} := \frac{\sum_{i=now-w+1}^{now} x_i}{w}; \bar{x} > x_{now-w+1}\left(1 + \frac{1}{100}v\right) \vee \bar{x} < x_{now-w+1}\left(1 - \frac{1}{100}v\right)$$

Rising Edge Aggregators

A rising edge aggregator 440 detects rising edge events. A rising edge event is an event that occurs when the sensor data values rise faster than a given rate.

The rising edge aggregator 440 requires input specifying a window size and a steepness value. The window size indicates the number of sensor data values to be considered and the steepness value indicates the minimal steepness required of the rising edge.

In one implementation, the rising edge aggregator 440 behaves according to the following algorithm, expressed in pseudo-code. In this pseudo-code, "$x_i$" represents the sensor data value at time i.

```
loop forever {
    Delta = X_now - X_now-Window_Size+1
    if (Delta/Window_Size ≥ Steepness)
        then issue 'Value Raised' message
}
```

This algorithm can also be expressed mathematically as follows. In this mathematical expression, "$x_i$" represents the sensor data value at time i, "s" represents the steepness value, and "w" represents the window size.

$$s \leq \frac{x_{now} - x_{now-w+1}}{w}$$

Falling Edge Aggregators

A falling edge aggregator 450 detects falling edge events. A falling edge event occurs when the sensor data values fall faster than a given rate.

The falling edge aggregator 450 requires input specifying a window size and a steepness value. The window size indicates the number of sensor data values to be considered and the steepness value indicates the minimal steepness required of the falling edge.

In one implementation, the falling edge aggregator 450 behaves according to the following algorithm, expressed in pseudo-code. In this pseudo-code, "$x_i$" represents the sensor data value at time i.

```
loop forever {
    Delta = X_now-Window_Size+1 - X_now
    if (Delta/Window_Size ≧ Steepness)
        then issue 'Value Fell' message
}
```

This algorithm can also be expressed mathematically as follows. In this mathematical expression, "$x_i$" represents the sensor data value at time i, "s" represents the steepness value, and "w" represents the window size.

$$s \leq \frac{x_{now-w+1} - x_{now}}{w}$$

The above-described sensor data aggregators 130 can be implemented as stand-alone software. Alternatively, they can be components of a larger software system, for example, of a data integration system. Also, they can be implemented as hardware components collocated with the actual sensor devices.

Data Integration System

Figure 5:
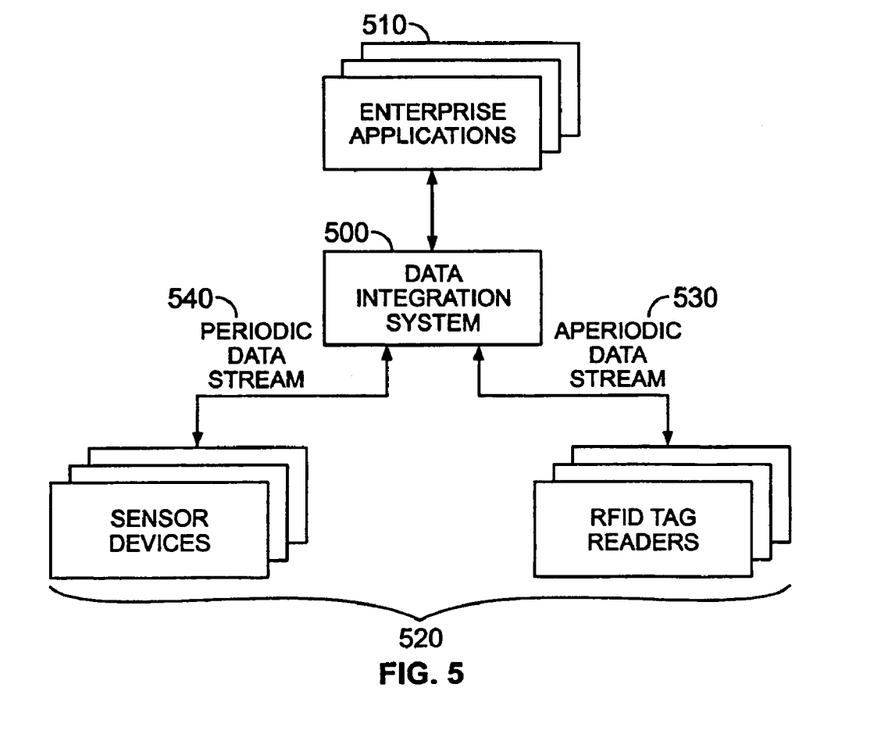
FIG. 5 illustrates sensor event aggregators as components of a data integration system.

As shown in FIG. 5, a data integration system 500 links enterprise applications 510 with data acquisition devices 520. The data acquisition devices 520 include both devices that emit aperiodic data streams (e.g., RFID tag readers) and devices that emit periodic data streams (e.g., sensor devices). The data integration system 500 can handle both types of data streams. The enterprise applications 510 include applications that use either or both types of data streams.

Figure 6:
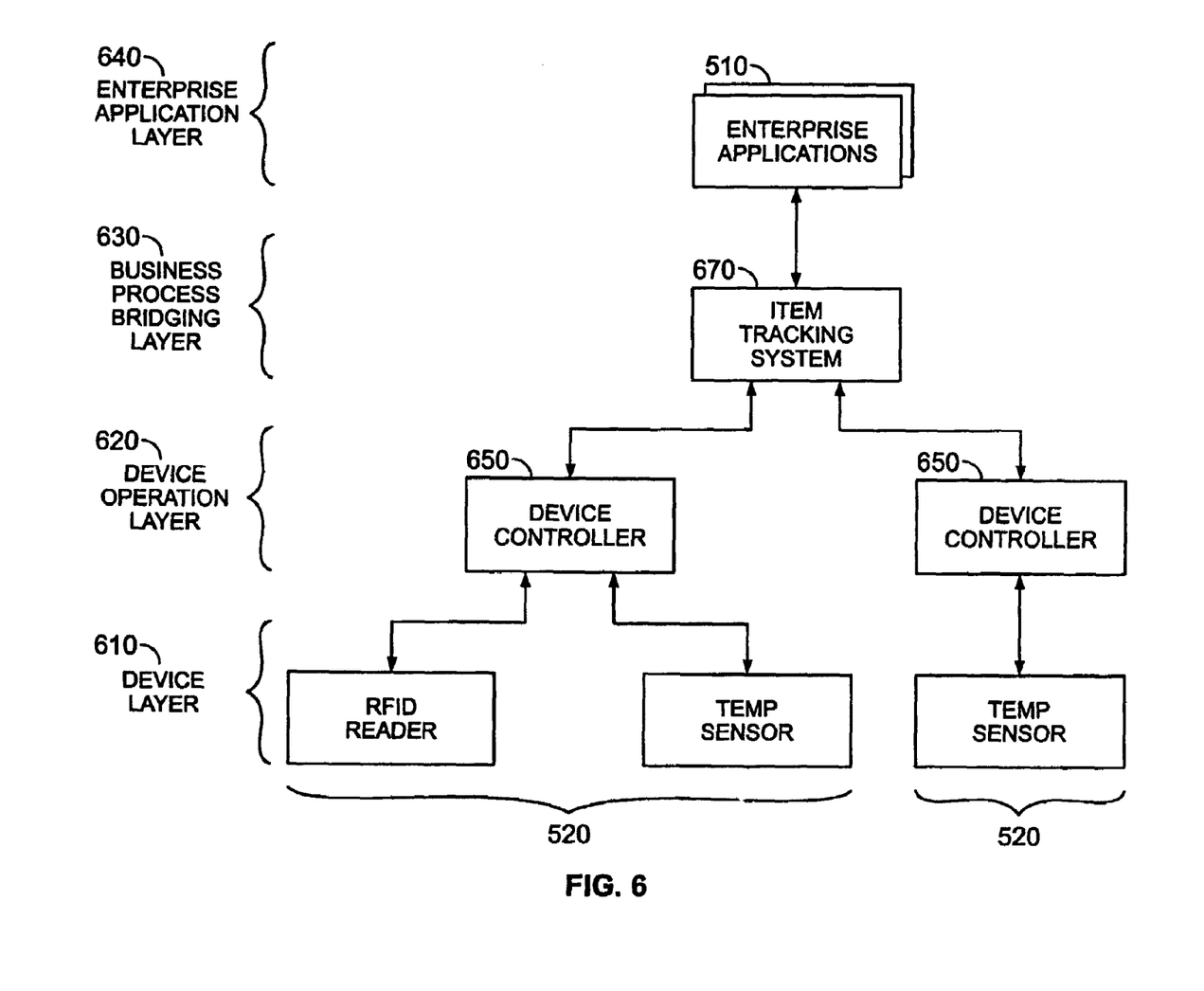
FIG. 6 illustrates one implementation of a data integration system.

In one implementation, as shown in FIG. 6, a system that includes a data integration system 500 operable to link enterprise applications 510 with data acquisition devices 520 can be represented conceptually as four layers: a device layer 610, a device operation layer 620, a business process bridging layer 630, and an enterprise application layer 640.

The bottom layer, device layer 610, represents the data acquisition devices 520. The topmost layer, the enterprise application layer 640, represents the enterprise applications 510. The two middle layers, device operation layer 620 and business process bridging layer 630, represents the data integration system 500.

The device layer 610 includes different types of data acquisition devices 520, for example, RFID tag readers, environmental sensors, and PLC (Programmable Logic Control) devices, which are devices commonly used in factory automation. The device layer 610 also includes a hardware-independent, low-level interface for reading and writing data from and to the different types of data acquisition devices 520. The device layer 610 reads data from the data acquisition devices and reports the data to the next layer, the device operation layer 620.

The device operation layer 620 includes one or more device controllers 650. Each device controller 650 is responsible for coordinating one or more of the data acquisition devices 520. Each device controller 650 receives data from a data acquisition device 520 through the device layer 610 and forwards the data to the next layer, the business process bridging layer 630. Before forwarding the data, the device controller 650 can process the data, for example, using a chain of data processors. Device controllers and data processing chains will be described in more detail below and are also described in U.S. patent application Ser. No. 10/854,766, entitled "Generic Software Mechanism for the Control of RFID Readers and other Devices".

The business process bridging layer 630 associates incoming data with business processes performed by the enterprise applications 510. In one implementation, these business processes involve the storage and transport of physical items, for example, goods in a supply chain. The business process bridging layer 630 includes a database system that records the status and history of these physical items. The database records can include information about the item's location, environment, and relationship to other items. This database system and the corresponding tracking functionality will be referred to as an item tracking system 670. The item tracking system 670 can be distributed across multiple locations, referred to as nodes.

The enterprise application layer 640 supports business processes of enterprise applications such as Supply Chain Management (SCM), Customer Relationship Management (CRM), Asset Management, or First Responder Support, etc.

Device Controllers

As described above, a device controller (e.g., device controller 650) is responsible for coordinating one or more data acquisition devices and reporting the data to the item tracking system 670. A device controller can operate in two modes: synchronous and asynchronous.

In the synchronous mode, the device controller 650 receives messages from the item tracking system 670 for direct device operations, such as to read or write a specific data field from/to a tag currently in the range of an RFID reader, or to read the value from a temperature sensor at a given point in time.

In the asynchronous mode, the device controller 650 waits for incoming data from the sensor devices. Upon receiving such data, the data can be filtered or aggregated according to the configuration of the device controller 650. When a device controller 650 is configured for asynchronous operations, it is still capable of synchronously receiving and executing commands.

Data processing in the device controller 650 is performed by one or more data processors. We distinguish six different types of data processors: filters, enrichers, aggregators, writers, buffers, and senders.

Filters filter out certain data according to specified criteria. Filters also clean out false reads ("data smoothing").

Enrichers read additional data from a tag's memory or other device and add this data to the original data received.

Aggregators can include either RFID aggregators or the above-described sensor data aggregators, or both. As described above, sensor data aggregators can be used to derive higher-level information from lower-level sensor data. RFID aggregators cannot perform this derivation of high-level information. They simply aggregate, or batch up, RFID data.

Writers are used to write to or change data on a tag or control an actuator.

Buffers buffer data for later processing. For example, they can maintain a list of tagged items currently in the reading scope of an RFID reader.

Senders transform the format of the data to a specific output format and send the data to registered recipients. An example of a specific output format is the Physical Markup Language format. As new formats are developed, new senders can be implemented and incorporated into the system.

The core functions of the device controller 650, in particular the data processing described above, are independent of the hardware used. For example, for reading and writing the data on the tags, the device controller 650 uses logical field names that represent abstractions of hardware-specific tag names. A field map provides the mapping between memory addresses on the tag and logical data fields.

Data Processing Chains

Since all data processors within the device controller 650 implement the same publish/subscribe interface, the data processors can be arranged into processing chains. Powerful message processing and filtering operations can be achieved by chaining together the right, possibly customized, set of simple data processors. This results in a very flexible framework that allows for the distribution of message processing functionality close to the actual sensor devices to reduce message traffic and improve system scalability.

Figure 7:
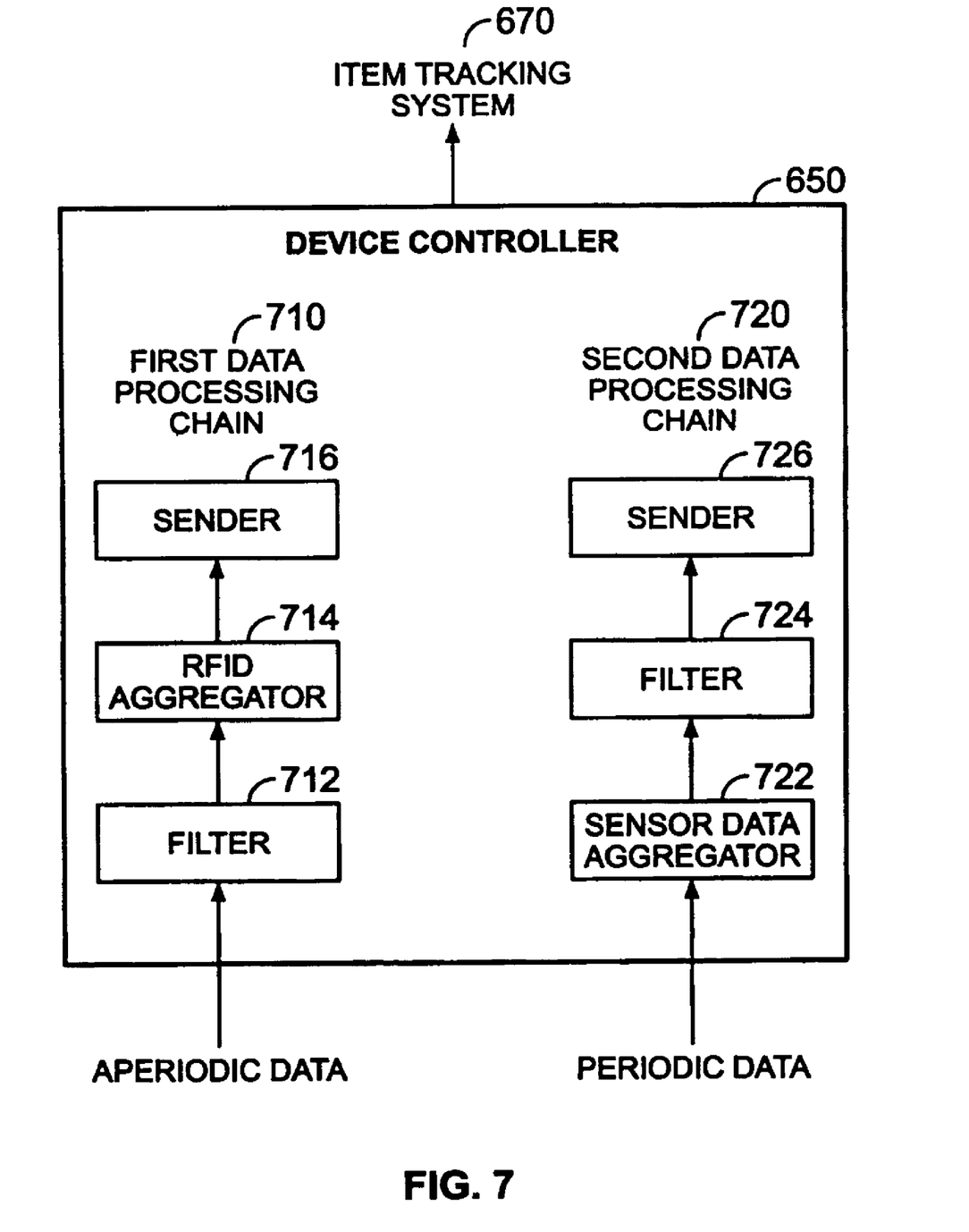
FIG. 7 illustrates examples of data processing chains within a data integration system.

FIG. 7 shows data processors 712, 714, 716, 722, 724, 726 arranged as two data processing chains 710 and 720 within a device controller 650. The first data processing chain 710 processes aperiodic data. In this example, the aperiodic data is emitted by RFID readers positioned next to the doors of a loading dock (not shown).

The first data processing chain 710 includes a filter 712, an RFID data aggregator 714, and a sender 716.

Every tagged item that passes one of the RFID readers causes the reader to issue two messages: a tag-appeared and a tag-disappeared reading.

The filter 712 can be used to filter out false messages. RFID readers sometimes generate false messages. For example, because of physical limitations, the reader may miss the appearance of a tagged item and only detect its disappearance. The filter 712 can filter out the false tag-disappeared messages.

The filter 712 can also filter out certain types of messages. For example, in the dock door scenario the system operator may only be interested in the fact that an item has reached the door. Thus, the filter 712 can filter out the tag-disappeared messages and only keep the tag-appeared messages.

The RFID aggregator 714 batches up all the messages for a certain time window and the sender 716 reports the collected messages in a single message to a backend system (not shown).

The second data processing chain 720 processes periodic data. In this example, without loss of generality, it can be assumed that the periodic data is emitted by a temperature sensor.

The second data processing chain 720 includes a sensor data aggregator 722, a filter 724, and a sender 726. In this example, the sensor data aggregator 722 is a rising edge type aggregator. The rising edge aggregator receives the sensor data from the temperature sensor and sends a notification when it detects that the temperature is rising more than a certain level of steepness.

The filter 724 is conceptually similar to the filter 712, but semantically different in that it uses different filtering criteria. In the given example, the filter 724 receives rising edge events from the sensor data aggregator 722 and filters out the events according to certain criteria, for example, if the actual temperature is still below a given threshold.

The sender 726 is similar to the sender 716. Both function to pass events to the next layer.

In the example of FIG. 7, the sensor data aggregator 722 is positioned at the bottom of the chain of data processors. In general though, sensor data aggregators 722 can be positioned anywhere in a chain of data processors.

Figure 8:
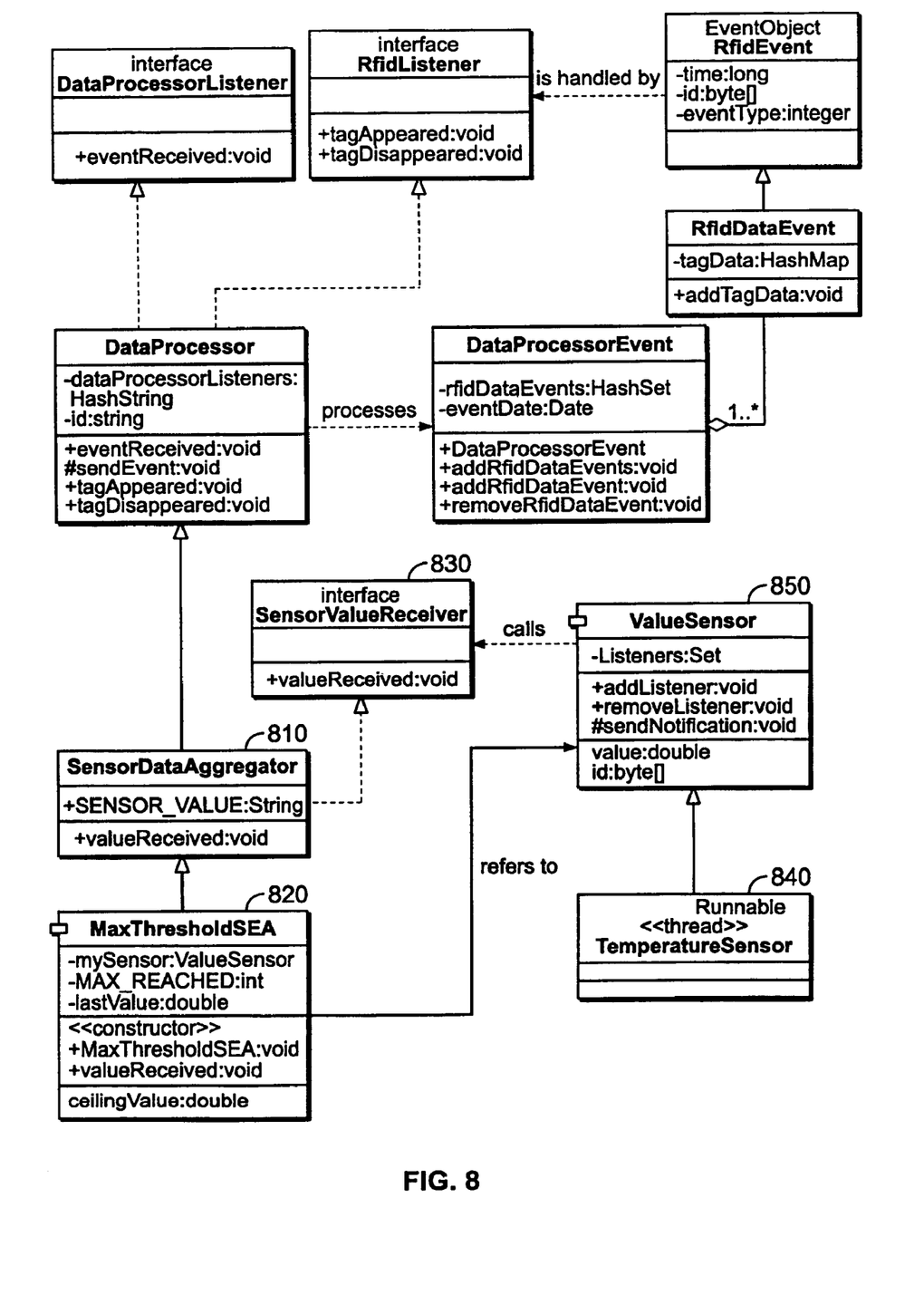
FIG. 8 is a class diagram illustrating one implementation of a sensor data aggregator.

The class diagram of FIG. 8 illustrates one implementation of sensor data aggregators (e.g., sensor data aggregator 722). In this implementation, a class SensorDataAggregator 810 defines attributes and behaviors that are common to all types of sensor data aggregators. Specific types of sensor data aggregators are represented by subclasses of the SensorDataAggregator 810. For example, the subclass MaxThresholdSEA 820 represents a maximum threshold aggregator.

The MaxThresholdSEA class 820 includes a mySensor variable that stores a reference to a sensor device being monitored and a lastValue variable that stores the last sensor value received from the sensor.

Additionally, the MaxThresholdSEA class 820 implements an interface, SensorValueReceiver 830, that provides the class with the ability to receive sensor values from sensor devices.

The class TemperatureSensor 840 represents a temperature sensor device. This class is a subclass of the class ValueSensor 850. The class ValueSensor 850 includes a set of listeners. The listeners are SensorValueReceivers 830. The Value Sensor 850 periodically notifies all listeners about the new sensor values. The class also provides a method, addListener, for adding a new listener to the set of listeners.

Figure 9:
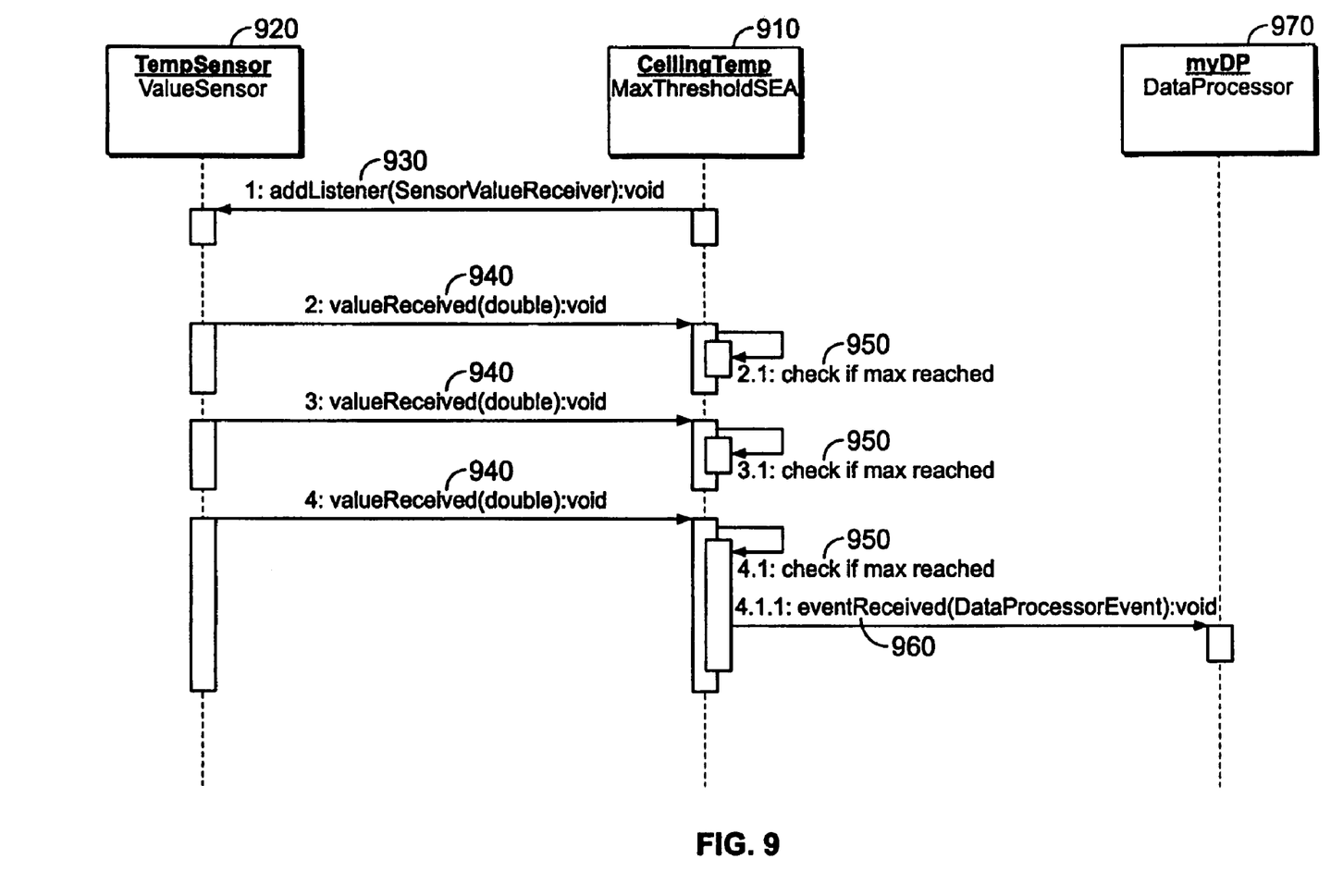
FIG. 9 is a sequence diagram illustrating the behavior of a sensor data aggregator.

As shown by the sequence diagram of FIG. 9, during system operation, a MaxThresholdSEA object 910 first registers itself to receive sensor readings from a sensor object 920, by adding a listener 930 to the sensor object 920. Once registered, the MaxThresholdSEA object 910 receives notification 940 of new sensor values. In response to the notification, the MaxThresholdSEA object 910 checks 950 if the maximum threshold value has been reached. The MaxThresholdSEA object 910 continuously receives notifications and checks to see if the threshold has been reached. Once the threshold has been reached, the MaxThresholdSEA object 910 sends a Threshold-Has-Been-Reached event 960 to the next data processor 970 in the chain.

The following is an example of program code implementing the class diagram of FIG. 8. The code is written in the Java programming language, but any object-oriented programming language can be used.

Example code for the SensorValueReceiver interface 830:

```
public interface SensorValueReceiver {
    void valueReceived(double val);
}
```

Example code for the SensorDataAggregator class 810:

```
abstract public class SensorDataAggregator extends DataProcessor
implements
SensorValueReceiver {
    public final String SENSOR_VALUE = "SensorValue";
    abstract public void valueReceived(double val) {
    }
}
```

Example code for the MaxThresholdSEA class 820:

```
import java.util.Date;
public class MaxThresholdSEA extends SensorDataAggregator {
    public double getCeilingValue( ){
        return ceilingValue;
    }
    public void setCeilingValue(double maxValue){
        ceilingValue = maxValue;
    }
    private double lastValue;
    private double ceilingValue;
    private     ValueSensor mySensor;
    private final int MAX_REACHED = 10;
    /**
    * @stereotype constructor
    */
    public MaxThresholdSEA(double maxValue, ValueSensor sensor) {
        mySensor = sensor;
        ceilingValue = maxValue;
        lastValue = mySensor.getValue( );
    }
    public void valueReceived(double value) {
        if ((value >= ceilingValue) && (lastValue < value)) {
            DataProcessorEvent dpe = new
            DataProcessorEvent(new Date( ), this);
            RfidEvent re =
                new RfidEvent(mySensor.getId( ),(new
                Date( )).getTime( ),
                    MAX_REACHED, mySensor);
            RfidDataEvent rde = new RfidDataEvent(re);
            rde.addTagData(SENSOR_VALUE, toByteArray(value));
            dpe.addRfidDataEvent(re);
            sendEvent(dpe);
        }
        lastValue = value;
    }
}
```

Example code for the ValueSensor class 850:

```
import java.util.Iterator;
import java.util.Set;
/**
* @stereotype thread
*/
abstract public class ValueSensor {
    public abstract double getValue( );
    public abstract void addListener(SensorValueReceiver listener);
    public abstract void removeListener(SensorValueReceiver listener);
```

-continued

```
    /**
    * Send a notification to all listeners
    **/
    protected void sendNotification( ) {
        Iterator iterator = Listeners.iterator( );
        while (iterator.hasNext( )) {
            SensorValueReceiver rec =
                (SensorValueReceiver) iterator.next( );
            rec.valueReceived(getValue( ));
        }
    }
    /**
    * Continuously call sendNotification
    **/
    private void run( ) {
        // to be implemented...
    }
    public byte[ ] getId( ){ return id; }
    private Set Listeners;
    private byte[ ] id; // the ID (e.g. EPC) of that sensor
}
```

The various implementations of the invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations can be implemented and are within the scope of the following claims. For example, the operations of the invention can be performed in a different order and still achieve desirable results. In certain implementations, multitasking and parallel processing may be preferable. Other implementations are within the scope of the following claims.

What is claimed is:

1. A system comprising:
   one or more enterprise applications;
   one or more data acquisition devices, the data acquisition devices including both periodic devices that emit periodic data and aperiodic devices that emit aperiodic data, periodic data being data that is emitted continuously at regular intervals, aperiodic data being data that is emitted at irregular intervals; and
   one or more data integration devices that connect the enterprise applications to the data acquisition devices, wherein each of the data integration devices includes at least one processor for processing the periodic data and at least one processor for processing the aperiodic data.

2. The system of claim 1, wherein:
   the one or more data integration devices further comprise a sensor data aggregator, the sensor data aggregator being software that is operable to perform operations including:
   receiving sensor data values emitted by one or more of the periodic devices;
   identifying the occurrence of a business event based on the sensor data values; and
   notifying an enterprise application of the occurrence of the business event, the business event constituting higher-level information derived from lower-level sensor data values.

3. The system of claim 2, wherein:
   the business event is a threshold value event, the threshold value event being an event that occurs when the sensor data values reach a threshold value.

4. The system of claim 2, wherein:
   the business event is a constant value event, the constant value event being an event that occurs when the sensor data values remain the same for a specified period of time.

5. The system of claim 2, wherein:
   the business event is a changed value event, the changed value event being an event that occurs when the sensor data values change within a specified period of time.

6. The system of claim 2, wherein:
   the business event is a rising edge event, the rising edge event being an event that occurs when the sensor data values rise more than a specified level of steepness.

7. The system of claim 2, wherein:
   the business event is a falling edge event, the falling edge event being an event that occurs when the sensor data values fall more than a specified level of steepness.

8. The system of claim 1, wherein identifying a business event based on the sensor data values includes:
   mapping multiple individual sensor data values to a single business event.

9. The system of claim 1, wherein:
   the enterprise applications include a product life management application; and
   the data acquisition devices include an environmental sensor that measures an environmental condition affecting one or more products managed by the product life management application.

10. The system of claim 9, wherein:
    the environmental condition is one of temperature, humidity, acceleration, pressure, light, position, movement, or sound.

* * * * *